(12) United States Patent
Sieracki

(10) Patent No.: US 9,329,305 B2
(45) Date of Patent: May 3, 2016

(54) INSPECTION OF HIDDEN STRUCTURE

(71) Applicant: Jeffrey M. Sieracki, Silver Spring, MD (US)

(72) Inventor: Jeffrey M. Sieracki, Silver Spring, MD (US)

(*) Notice: Subject to any disclaimer, the term of this patent is extended or adjusted under 35 U.S.C. 154(b) by 97 days.

(21) Appl. No.: 14/245,027

(22) Filed: Apr. 4, 2014

(65) Prior Publication Data

US 2014/0222371 A1    Aug. 7, 2014

Related U.S. Application Data

(63) Continuation of application No. 13/081,476, filed on Apr. 6, 2011, now Pat. No. 8,731,333.

(60) Provisional application No. 61/321,322, filed on Apr. 6, 2010.

(51) Int. Cl.
  G06K 9/36    (2006.01)
  G01V 11/00   (2006.01)
  G01V 3/15    (2006.01)

(52) U.S. Cl.
  CPC .............. *G01V 11/002* (2013.01); *G01V 3/15* (2013.01); *G01V 11/00* (2013.01)

(58) Field of Classification Search
  CPC ...................................................... G01V 11/00
  USPC ......................................... 382/291; 702/150
  See application file for complete search history.

(56) References Cited

U.S. PATENT DOCUMENTS

| | | | |
|---|---|---|---|
| 4,853,617 A | 8/1989 | Douglas et al. | |
| 5,457,394 A | 10/1995 | McEwan | |
| 5,541,605 A | 7/1996 | Heger | |
| 5,905,455 A | 5/1999 | Heger et al. | |
| 5,917,314 A | 6/1999 | Heger et al. | |
| 6,198,271 B1 | 3/2001 | Heger et al. | |
| 6,259,241 B1 | 7/2001 | Krantz | |
| 6,282,260 B1 | 8/2001 | Grodzins | |
| 6,535,835 B1* | 3/2003 | Rubin | A61B 8/06 702/159 |
| 6,674,276 B2 | 1/2004 | Morgan et al. | |
| 6,844,713 B2* | 1/2005 | Steber | G01V 3/15 324/228 |
| 7,178,250 B2 | 2/2007 | Nash et al. | |
| 7,420,675 B2 | 9/2008 | Giakos | |
| 7,453,253 B2 | 11/2008 | Hoffmann et al. | |
| 7,679,546 B2 | 3/2010 | Bublitz et al. | |
| 2005/0105791 A1* | 5/2005 | Lee | G01N 21/47 382/145 |
| 2007/0046525 A1 | 3/2007 | Holbrook et al. | |
| 2007/0200547 A1 | 8/2007 | Chen | |
| 2008/0100503 A1* | 5/2008 | Yanagi | G01S 7/064 342/176 |
| 2010/0097212 A1 | 4/2010 | Wingate et al. | |

(Continued)

FOREIGN PATENT DOCUMENTS

WO    WO2006044947    4/2006

*Primary Examiner* — Gregory F Cunningham
(74) *Attorney, Agent, or Firm* — Edell, Shapiro & Finnan, LLC

(57) ABSTRACT

An inspection apparatus determines information indicative of structure that may be hidden behind an obscuring boundary, such as a wall. A processor collects measurements of properties characterizing the hidden structure and measurements of location of the apparatus. The collected data are mapped to produce an image of intensity in the characteristic measurements. Each intensity value in the image reflects a measure of density, of material type, or of some other specific information by which hidden structure can be discerned. The intensity changes indicating the hidden structure are displayed to a user via color-coded pixels or the like.

22 Claims, 11 Drawing Sheets

(56) References Cited

U.S. PATENT DOCUMENTS

| | | |
|---|---|---|
| 2010/0109680 A1 | 5/2010 | Adams et al. |
| 2010/0117654 A1 | 5/2010 | Nielsen et al. |
| 2010/0156391 A1 | 6/2010 | Krapf et al. |
| 2010/0219965 A1 | 9/2010 | Krapf et al. |
| 2010/0225299 A1 | 9/2010 | Nguyen et al. |
| 2011/0164191 A1 | 7/2011 | Brown |
| 2011/0227778 A1 | 9/2011 | Mohamadi et al. |
| 2012/0307039 A1 | 12/2012 | Holmes |

* cited by examiner

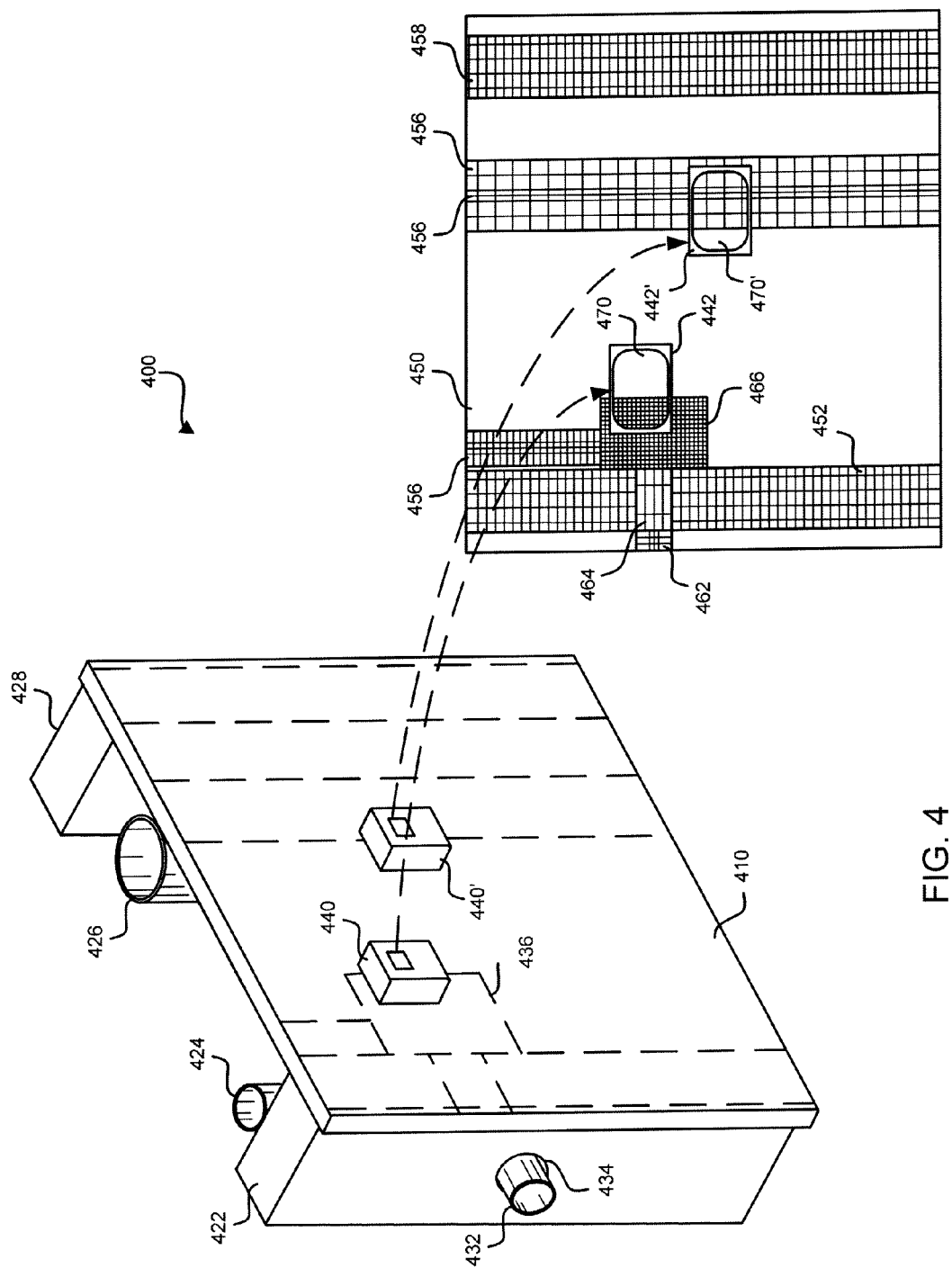

INSPECTION OF HIDDEN STRUCTURE

CROSS-REFERENCE TO RELATED APPLICATIONS

This patent application is a continuation of patent application Ser. No. 13/081,476, filed Apr. 6, 2011, which claims benefit of priority of provisional patent application 61/321,322, filed on Apr. 6, 2010, the disclosure of which is incorporated herein by reference.

BACKGROUND

The present general inventive concept is directed to moving spatial sensors and associated image and signal processing for inspection of materials and/or structure in a region of interest. The general inventive concept finds applicability in, among other things, imaging of hidden structures and objects in and behind obscuring surfaces, such as, for example, walls. The present general inventive concept achieves benefits over other devices, such as so-called "stud-finders" and other related construction and building inspection tools, by providing a spatial image of the area hidden by an obscuring barrier, such as wall covering material.

Conventional stud finders provide users with information relating to hidden structure in walls, such as the positions of wooden and metal studs, and in some cases, electrical wires or pipes. This is achieved by an assortment of data acquisition techniques, including measurements of material density or material transitions via, among others, RF, ultrasonic, magnetic, electrical and dielectric capacitance measurements. Stud finders are typically divided into those that detect the center of the stud, or other object of density, and those that detect edges at a sharp density transitions. One limitation in the prevailing art is that only a single stud, or other object of interest, can be visually located at one time, using the hand-held devices' built-in indicators. Typical designs allow only a small region to be examined at a time; it is up to the user to mark the wall in such a way as to make sense of the overall structure behind it. If exploring the wall to seek out specific structures, as opposed to just the nearest stud, extensive marks with tape, pen, pencil or the like must be made before the hidden structure can be visualized. An additional limitation is that the sensors are generally preferentially biased to detect transitions in only one dimension. While this is adequate for the primary task of stud finding, it requires the user to rotate the device and start over to look for other structure, such as horizontal blocking between studs. In the case of ceilings, floors, or other arrangements in which structural members are concealed, a user may be required to possess and apply learned experience in determining the expected orientation of studs, beams, joists, etc. A further limitation of present devices is in dynamic range; conventional devices are generally self-calibrating and require learned finesse on the part of the user and often multiple attempts in order to successfully identify internal wall structure. Moreover, devices of present art generally reduce sensitivity to accommodate the strongest sensor return, thus making it very difficult to detect multiple hidden objects of differing densities and/or depths without many small iterative passes across the wall surface.

SUMMARY

The present general inventive concept provides a coupling of a sensor by which hidden structure can be detected, such as a density sensor, to a system for tracking position in one, two, or three dimensions. The information obtained from such coupling may be accumulated from multiple sensing points and imaged onto a display system to present a two-dimensional depiction of structure obscured by a boundary. In contradistinction with conventional devices, the image produced by embodiments of the present general inventive concept, the two-dimensional image presented to the user spatially corresponds to the region traversed in multiple directions by the sensors.

The foregoing and other utility and advantages of the present general inventive concept may be achieved by an apparatus to inspect a region of interest for structure therein. A sensor generates at least one characteristic signal responsive to at least one structural characteristic of the region of interest at a location on a surface therein of the sensor. The same or another sensor generates a position signal indicative of the location on the surface. A processor generates numerical values from the characteristic signal and the position signal as the sensor is translated over the surface and establishes an association between the numerical values generated from the position signal and the numerical values generated from the characteristic signal. A display generates a two-dimensional image from the associated numerical values so as to be perceived by a human user. The displayed image represents the structure in the region of interest obscured by and parallel to the surface.

The foregoing and other utility and advantages of the present general inventive concept may also be achieved by an apparatus to inspect a region of interest. The apparatus includes an inspection sensor having a predetermined contact area over which a characteristic measurement is made thereby at a location on a surface in the region of interest. A position/motion sensor determines the location at which the characteristic measurement is made. A data storage unit stores a data map in which map values are stored in correspondence with a predetermined coordinate system. A processor collects successive characteristic measurements from the inspection sensor made along a scan trajectory. Numerical values are generated from the characteristic measurements and the map values are computed from the numerical values. The processor stores the map values in the data map such that locations in the scan trajectory at which respective characteristic measurements are made spatially correspond with the coordinate system of the data map. A two-dimensional image of pixels is displayed on a display, where the pixels are assigned pixel values determined from the map values. The image is centered in a graphical window positioned in the display in accordance with the locations in the scan trajectory.

The foregoing and other utility and advantages of the present general inventive concept may also be achieved by a method of determining structure obscured by a surface in a region of interest. A data map is established that is indexed in accordance with a predetermined coordinate system. Characteristic measurements are obtained by translation of a sensor over the surface, where the characteristic measurements are made at arbitrary locations along a scan trajectory through which the sensor is translated. Numerical values of the characteristic measurements are mapped to numerical values indexed in the data map. A two-dimensional image of pixels is displayed, where the pixels are arranged per the predetermined coordinate system and are assigned pixel values corresponding to the numerical values indexed in the data map.

BRIEF DESCRIPTION OF THE DRAWINGS

These and/or other aspects and utilities of the present general inventive concept will become apparent and more readily appreciated from the following description of exemplary embodiments, taken in conjunction with the accompanying drawings, of which:

FIG. 4 is an illustration of an exemplary application of an embodiment of the present general inventive concept;

DETAILED DESCRIPTION

Figure 1:
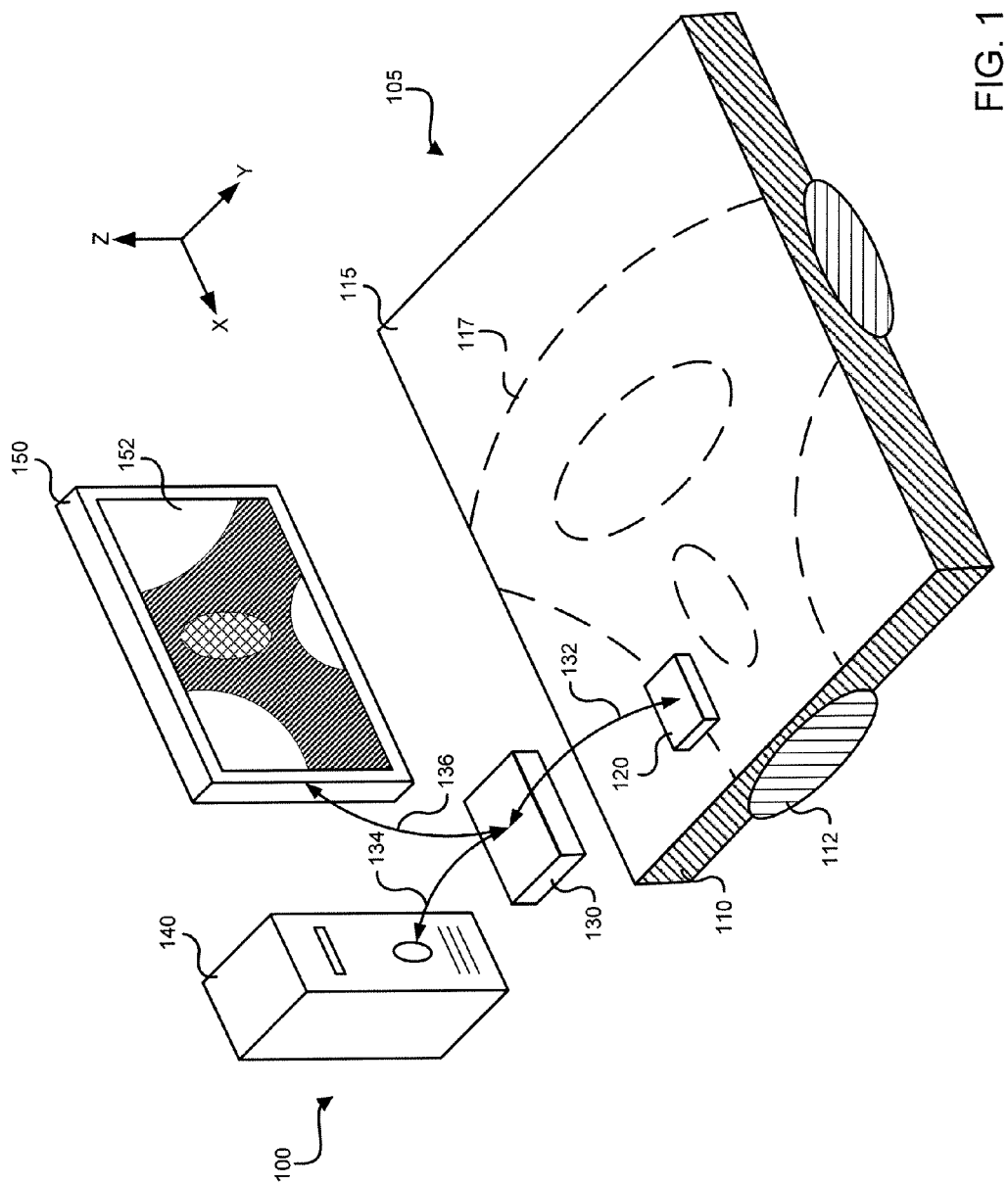
FIG. 1 is conceptual block diagram illustrating basic functionality of embodiments of the present general inventive concept.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Referring to FIG. 1, there is illustrated an exemplary inspection apparatus 100 by which the present invention may be embodied. The inspection apparatus 100 is compartmentalized into exemplary subsystems for purposes of explanation: a sensor subsystem 120 to generate signals indicative of a position in a region of interest and a characteristic value at the position, a processing subsystem 140 to process the signals into a map of hidden structure in the region of interest, a graphics subsystem 150 to graphically display the map in a meaningful way to a user, and a communications subsystem 130 to coordinate and convey data and control signals between subsystems. It is to be understood that the distribution of functionality across the exemplary subsystems illustrated in FIG. 1 is for purposes of description and not limitation; numerous alternative system configurations can be used to embody the present invention without deviating from the spirit and intended scope thereof.

The sensor subsystem 120 may be placed proximal to or in contact with a surface 115 of an inspection region 105, which, as used herein, refers to a region in space in which direct inspection of objects of interest is prevented. As illustrated in FIG. 1, inspection region 105 includes surface 115, which obscures and prevents direct inspection of structure 117. Structure 117 may be present in the inspection region 105 for numerous of reasons, such as, for example, due to man-made or natural construction in the inspection region 105 or as unintended byproducts of man-made or natural processes. Such structure 117 may be detected by suitable probing techniques that sense variations in physical properties in inspection region 105, representatively illustrated as changes in materials 110, 112. Data acquisition by which such variations in physical properties are obtained is referred to herein as a characteristic measurement.

In accordance with achievable benefits of the present invention, sensor subsystem 120 may be moved within inspection region 105, such as in the X/Y plane defined by surface 115, to obtain characteristic measurements of hidden structure 117. It is to be understood that although surface 115 is illustrated in FIG. 1 as a planar surface, the present invention is not limited thereto. For example, when implemented with suitable sensors, sensor subsystem 120 may characterize hidden structure 117 obscured by a barrier that is spatially variable in three dimensions. Sensor subsystem 120 generates signals by which structural variability in inspection region 105 may be discerned despite the obscuring barrier. For example, sensor subsystem 120 may include one or more devices that can produce at least one signal from which characteristics of hidden structure may be ascertained, including, but not limited to sensors that detect changes in capacitance, refractive index, magnetic fields or electric current, radio-frequency signal echo returns, ultrasonic echo returns, edge-finders, center-finders, A/C or D/C voltage detectors, thermal and optical detectors, and other sensing devices suitable for discerning material density or type, shapes or edge features. Sensor subsystem 120 may also include one or more devices that can produce at least one signal indicative of position, or change in position, including, but not limited to accelerometers, rotational encoders coupled to one or more balls or cylinders, and optical motion detectors. Additional means for sensing location can be employed, including devices the determine distance from a base point, such as may be measured by radio frequency (RF) or ultrasonic time of flight and geo-positioning, such used by the Global Positioning System (GPS). In certain embodiments of the present invention that track a change in position of sensor subsystem 120, as opposed to in indication of absolute position, an origin may be established against which relative location can be tracked.

The characteristic and position signals may be converted into numerical values, such as by a suitable analog-to-digital (A/D) device, and a characteristic measurement value may be associated with one or more position values corresponding to the spatial position at which the characteristic measurement value was obtained. Exemplary processing subsystem 140 maps the associated numerical values to a data map, renders an image of image pixels corresponding to the mapped data, and displays the image on a display 152 of graphics subsystem 150. Thus, in accordance with achievable benefits of the present invention, hidden structure 117 is faithfully represented to a user through a two-dimensional image on display 152.

Exemplary communication subsystem 130 transfers various signals between subsystems of inspection apparatus 100 through a set of communication links 132, 134, 136, which may be implemented in a suitable medium for carrying signals between components. For example, any of communication links 132, 134, 136 may be implemented in electrical conductors, including wires, cables, printed circuits, optical media, such as optical fibers, air, vacuum, etc. Moreover, the communication links 132, 134, 136 need not be implemented in the same medium, whereby multiple system component groupings can be realized. For example, certain subsystem components may be contained in the same housing separate from other subsystem components. Accordingly, the system components sharing a housing may communicate in one medium, e.g., printed circuit wiring, and may communicate with other system components via another medium, e.g., a wireless communication link. The ordinarily skilled artisan will recognize and appreciate that a variety of physical groupings of system components that may be achieved by prudent selection of communication media, housings, casings, chasses, etc. The present invention intentionally embraces such alternative embodiments.

Figure 2A:
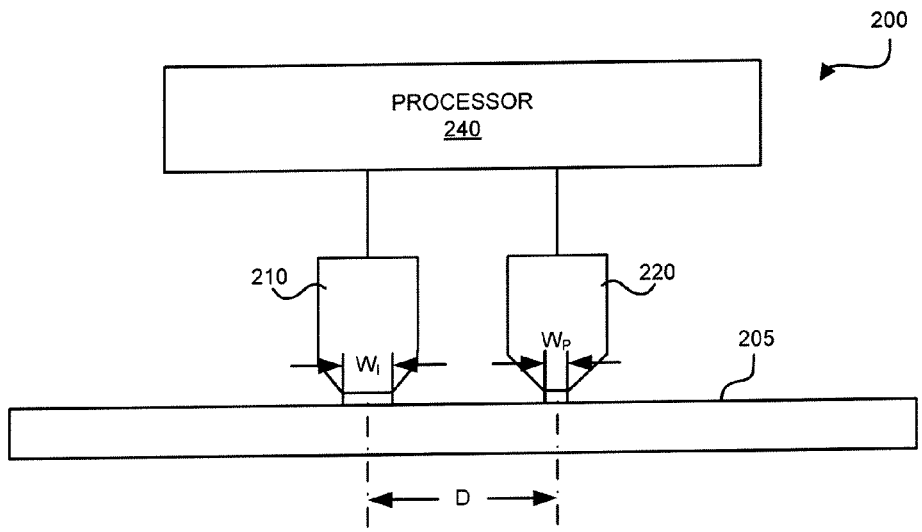
FIG. 2A is a schematic block diagram of a minimal sensor arrangement by which the present general inventive concept may be embodied.

FIG. 2A depicts an exemplary sensor arrangement 200 in sensor subsystem 120 by which data acquisition may be achieved in accordance with the present invention. Sensor arrangement 200 includes an inspection sensor 210, by which a characteristic measurement may be obtained, and a position/motion sensor 220, by which a location on surface 205 is obtained. The sensors 210, 223 may be coupled to a processor 240, by which electrical signals therefrom may be conditioned, sampled, converted to numeric values and assembled into data structures in accordance with the present invention. As illustrated in figure, sensors 210, 220 may be separated by a known distance D, which may be compensated for in determining the actual location of the characteristic measurement by inspection sensor 210. Further, it is to be observed that inspection sensor 210 may have a contact area on surface 205, representatively illustrated by dimension $W_I$, which is greater than that of the position/motion sensor 220, which is representatively illustrated as dimension $W_P$. It is to be understood that while the term contact area is used for purposes of description, one or more sensors 210, 220 may not physically come in contact with surface 205. Contact area, as used herein, refers to an area on surface 205 over which any one characteristic measurement and/or position determination is made, regardless of whether actual contact with the surface is made. Thus, an effective contact area may include areas that are larger or smaller than the actual surface area of a sensor, which may, in turn, affect the depth of the sensing field into the material.

Figure 2B:
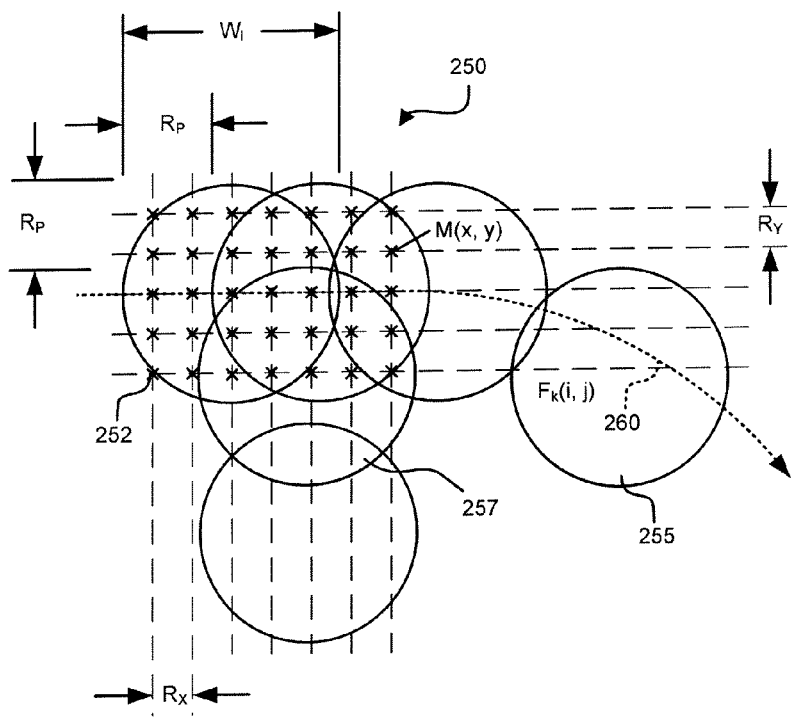
FIG. 2B is a conceptual block diagram of an exemplary data acquisition and mapping process usable with embodiments of the present general inventive concept.

In FIG. 2B, there is illustrated a conceptual block diagram of an exemplary data acquisition and processing technique as may be implemented in embodiments of the present invention. Each circular region, representatively illustrated at circular region 255, represents a contact area of inspection sensor 210 having a diameter $W_I$. It is to be understood that although contact areas 255 are illustrated as being circular, contact areas of various shapes may be used in conjunction with the present invention without departing from the spirit and overall scope thereof. Additionally, the dimension $R_P$ in FIG. 2B represents the finest resolution in position detectable by position/motion sensor 220. It is to be understood that the dimension $R_P$ is illustrated in FIG. 2B as being substantially equivalent in the X and Y directions, such is solely for convenient illustration purposes and is not intended to limit the present invention. It is to be understood further that the actual distance between measurements vary across embodiments, but will generally depend on the translation speed of sensors 210, 220, the trajectory 260 of the translation and the sampling rate of processor 240, among other things.

The ordinarily skilled artisan will appreciate that certain sensors that may be used in embodiments of the present invention are not uniformly responsive across the sensing area. As such, the same structure in a region of interest may produce a larger or smaller signal depending upon the placement of the sensor relative thereto. Certain characteristic measurement sensors, such as density sensors, may produce the strongest signal responsive to structure that is centered on the contact area and produce increasingly weaker signals when such structure is located further away from centered on the contact area. In contrast, other measurement sensors, such as edge-detecting sensors, may produce the strongest signal when a material transition in the hidden structure, such as an edge, is centered in the contact area and oriented in a preferred direction for the sensor design. Additionally, certain sensors will respond differently depending upon the depth into the material that the sensing field can penetrate. The proportional response of a particular sensor to the location and orientation of structure in the region of interest relative to the contact area is referred to herein as the sensor's spatial sampling function.

In certain embodiments of the present invention, the data that are ultimately processed and displayed are arranged in a predetermined map arrangement 250, such as on a rectangular grid illustrated in FIG. 2B, of spatial resolution defined by dimension $R_X$ and $R_Y$. At each location 252 in data map 250, a numerical value is stored that is computed from one or more measurements as sensors 210, 220 are translated across the surface 205. It is to be understood that other data arrangements can be used with the present invention without departing from the spirit and overall scope thereof. However, it will be appreciated by the skilled artisan that representation of measurement values in a rectangular grid lends naturally to display of this information on pixel-based graphics subsystems.

Characteristic measurements may be made along a scan trajectory 260 at a location on surface 205 denoted by (i, j). As used herein, a scan trajectory refers to directed motion in one, two or three dimensions in the region of interest over which characteristic measurements are made at arbitrary locations thereon. It is to be understood that while trajectory 260 is illustrated in FIG. 2B as proceeding from left to right, a typical scan trajectory will be made in left to right, up to down, down to up, right to left, circular, diagonal, etc., directions to cover a desired area. A scan trajectory may, in certain embodiments of the present invention, proceed according to directed raster scan. However, in certain embodiments of the present invention, such as in hand-held devices, a scan trajectory 260 may be any free-form path on surface 205.

As motion over surface 205 proceeds, processor 240 will obtain a k-th characteristic measurement $F_k(i, j)$. As is illustrated in FIG. 2B, overlap of sensed regions may exist, representatively illustrated at overlap 257, between the contact area over which $F_k(i, j)$ is made and the contact area of previous measurements. Given that the sensor is responsive in accordance with a spatial sampling function, $$F_k(i,j) = [d(x,y,z) \otimes S]|_{(x,y)=(i,j)}.$$

Thus, $F_k(i, j)$ may be considered as the convolution of the actual characteristic, e.g., density $d(x, y, z)$ measured at the surface with the spatial sampling function S inherent to the sensor evaluated at $(x, y)=(i, j)$. The practical effect of this is that one measurement $F_k$ taken at sample time k represents the sensor's weighted estimation of the structural characteristic, e.g., density, measured at the surface of the region of interest from the volume that is under the sensor's contact area.

In accordance with embodiments of the present invention, the measurements $F_k(i, j)$ are mapped at locations $(x, y)$ therein according to M: $\{F_1, \ldots, F_k\} \rightarrow \phi(x, y)$, where $\phi(x, y)$ is an estimate of $d(x, y)$, the actual density of the material at for point $(x, y)$ in map 250. That is, each data location 252 in map 250 may be computed from any and all measurements made over one or more contact areas corresponding in position to the coordinate $(x, y)$ therein. Moreover, in certain embodiments of the present invention, map 250 is continuously updated as sensors 210, 220 proceeds along trajectory 260.

To illustrate an exemplary operation M, it is to be assumed that a sensor has an inherent spatial sampling function that shapes the response thereof to the density of material under the contact area in accordance with an isotropic Gaussian, i.e., centered at the middle of the contact region and falling off with standard deviation of $\sigma$. Such operation M maps the characteristic measurement data to a fixed grid with spacing of, say, $R_P$, the minimum spatial resolution of position sensor. If $\sigma$ is small in relation $R_P$, then each characteristic measurement $F_k$ can simply be mapped to the nearest data location 252 in the map 250. The operation M is in this case uncomplicated, since there is little spatial spread of the sampling function. However, if a sensor is used with a large $\sigma$ in the sampling function, then, to maintain spatial accuracy of the estimates, overlap of the sampling functions for neighboring characteristic measurements cannot be ignored. It will be understood and appreciated by those skilled in the art that the characteristic measurements may be treated as a decomposition of the actual physical density function $d(x, y)$.

That is, $d(x, y) \approx \Phi(x, y) = \Sigma F_k \phi(x_k, y_k)$, where $\phi(x_k, y_k)$ is a locally supported weighting function that spans an area around the sampled point $(x_k, y_k)$. The sum is taken over all samples k for which the characteristic measurements $F_k$ are taken over contact areas that significantly overlap the map point 252 for $(x, y)$.

When spatial sampling functions are substantially orthogonal, the spatial sampling functions, normalized to unit area under its characteristic curve, may be applied directly as decomposition basis elements $\phi$. The characteristic measurement $F_k$ may then be distributed to all points in the grid neighborhood around $(x_k, y_k)$ proportionally weighted by the sample function so that the total of the increase of the local data values sums to $F_k$. Where the spatial sampling functions significantly overlap and are not orthogonal, additional measures must be taken to avoid counting characteristic measurement information twice. One means of achieving an accurate localized density estimate is to begin with the measurement $F_k$ centered on the point of interest $(x_k, y_k)$ and to subtract measurements taken in the neighborhood around this point in proportion to the overlap of the neighboring sampling functions. As will be understood by those skilled in the art, this overlap may be calculated from the inner products of each normalized sampling function with its neighbor, in a process consistent with, for example, the Graham-Schmidt process. In certain specific cases, which will be understood by those skilled in the art, non-orthogonal overlapping sampling functions may form a mathematical frame that behaves in manner similar to a basis, i.e., such that the summed sampling functions have constrained total area under the curve and treated as if no overlap existed.

In certain embodiments of the present invention, contact area overlap may be treated as viewing each measurement $F_k$ as a sample of an unknown underlying density distribution, and to estimate, using joint information from all overlapping samples, the maximum likelihood distribution of actual materials behind obscuring surface. Bayesian and other statistical analyses may be used to achieve such an estimate from a set of characteristic measurements. The joint information may be reduced to a single density surface estimate using orthogonal matching pursuits or simultaneous orthogonal matching pursuits, as will be understood by ordinarily skilled artisans. Other equivalent techniques for mapping arbitrarily located measurements onto a fixed grid include sparse approximation and compressive sensing, which may be used in conjunction with the present invention without departing from the spirit and intended scope thereof.

In certain embodiments of the present invention, each characteristic measurement sample $F_k$ may be stored in a storage device. Alternatively, only values 252 in the map 250 are stored and progressively updated, and individual measurements $F_k$ are discarded from memory once mapped onto the data map 250. Storing the history of measurements has the advantage that at each point, joint information from all samples may be reconsidered to produce a best approximate map. On the other hand, storing only the working data map 250 simplifies computational and memory requirements.

Embodiments of the present invention can progressively improve data detail in the data map 250 and images derived therefrom as follows. A first characteristic measurement $F_k$ may be made and data map 250 may be populated by adding values to locations 252 around the corresponding point $(x, y)$ as weighted by the sampling function of the sensor. The sensor subsystem 120 is moved and a second measurement is made, etc. For this and each subsequent measurement, data map 250 is updated by examining jointly the existing density values in map 250 and the location and sampling function applicable to the new measurement and adjusting the density of displayed pixels in the neighborhood around the new measurement point to the least extent that is still consistent with the new measurement. For example, by summing the new measurement response with the previously populated data map 250, and then reweighting the data values in a surrounding neighborhood as the new measurements are taken, an iteratively improving density map 250 may be produced as measurement values corresponding to partially overlapping contact areas accumulate in the vicinity of each location 252.

In certain embodiments of the present invention, sensors are employed that detect edges in a preferred orientation. For example, a spatial sampling function may provide maximal response when an edge is oriented perpendicular to the sensor and falls in its center, and falls off with distance squared only in the direction perpendicular to the edge. To map sensor data to a fixed grid with spacing $R_p$, for example, it is first to be noted that in order to sense edges in both X and Y directions, at least two orthogonal sensors are required, such as is illustrated in FIG. 7B. Sensors 763, 767 are orthogonal and spatially displaced. Thus, each measurement $F_k$ will have two disjoint components as a sensor contact area, and each component of the contact area will have a response function that corresponds to detection of an edge in its center. If, for example, sensor 767 detects vertical edges and sensor 763 detects horizontal edges, edges that are at an angle will be partially detected by both sensors. In order to capture information about edges in both orientations at each point $(i, j)$ over the obscuring surface, the sensor configuration 750 must be moved in a way that both sensor regions eventually pass over each point of interest on the surface. The operation M to map measurements to data map 250, and accordingly to a display, may have several processing components. Respective responses of each sensor 767, 763 may be examined for extrema to locate edges at location $(i, j)$ in each sensor's particular orientation. Two separate maps 250 containing edge-like feature data may thus be generated. The separate maps may then be registered one with the other and a joint edge-response may be calculated for each point in the resulting data map 250. Such process may produce an edge plot and, with sufficient sampling, the embodiment may display a suitably coded pixel for each point at which an edge is detected, thus depicting, for example, studs and pipes by their edge outlines in the display. In another embodiment, a joint estimate of the orientation of an edge may be determined by, for example, evaluating the X edge data and Y edge data as respective derivatives in the X and Y directions and forming a gradient vector from their combined readings at each point $(x_k, y_k)$. The resulting data may be displayed through oriented bars of pixels that correspond in length to the width of the contact area. When so embodied, the appearance of solid estimated edges is provided even when the scan trajectory has not densely covered the surface.

In certain embodiments of the present invention, domain knowledge of likely features may be applied to improve the informational content of the displayed data. For example, the dimensions and orientations of lumber, e.g., 2×4 studs, or other common features, e.g. pipes, electrical conduit, etc. can be matched on a feature recognition basis with the data as it is acquired. Such process may be used to (a) label or color code a detected feature and (b) to optimize and sharpen images by adjusting the irregularly sampled density map to match the most likely distribution of actual hidden structures.

Rotation and alignment of measurements made by embodiments of the present invention may also be considered. In general, the accuracy of position knowledge is limited, as is the ability of the user to hand-hold an inspection apparatus in fixed orientation as it is moved over a surface. Relative motion sensing using inertial sensors, for example, may drift and slippage may occur in embodiments employing rotational contact sensors. Embodiments of the present invention may include means for maintaining consistency in the recorded data sets even in the presence of such deficiencies. Rotation can in many embodiments be tracked by suitably supplementing accelerometer signals with knowledge of which way is down with respect to gravity. Knowledge of device rotation and orientation may be used to compensate the sensor sampling functions relative to the orientation of data map 250. Device rotation may also be considered in determining directions of relative motion of the inspection apparatus. Errors in position determination and knowledge of device rotation may be used to compensate data in map 250 for changing alignment and device orientation during repeated measurements made at nearby points. For example, it is a natural human inclination to move a hand-held inspection apparatus over a surface in a way that tends to fill area sparsely as one might color in a region with a crayon. By monitoring the alignment of new data acquired in nearly repeated positions with previously acquired data in data map 250, embodiments of the present invention may detect device slippage, rotation and other spatial calibration anomalies. In simple embodiments, an alarm may warn the user that data acquisition is not synchronized, at which time data collection may be terminated. The inspection apparatus may query the user as to whether to restart the scan. In more sophisticated embodiments, the acquired data may be re-oriented through, for example, an affine transform of the existing map to best fit (in an $L^1$ or $L^2$ sense) the new data, thereby accounting for device rotation and slippage. Other transforms, such as shrinking or expanding certain recorded trajectory regions, may be used in conjunction with the present invention as well.

Other methods of feature tracking may be used in embodiments of the present invention to align a previously established data map to new data. As used herein, a measurement field refers to a two-dimensional sub-region of a data assemblage that is to be aligned with a similar two-dimensional sub-region of another. Cross-correlation, for example, may be applied to align measurement fields of new and previously acquired data. Such alignment may be augmented by applying Gaussian blurs of the two measurement fields at various scales, or by other related preprocessing methods. Alternatively, specific features such as corners or edges may be located and mapped from one measurement field to another, by which tie points may be established and an affine transform calculated. Similarly, computationally generated features such as Scale Invariant Feature Transform (SIFT) signatures may be computed and mapped from one to another.

In addition to allowing for incidental positional accuracy variations, certain embodiments of the present invention may also afford the user the ability to discontinue, and then subsequently resume acquisition of a data map 250. This will permit a user to, for example, begin scanning, say, a wall, to move the sensor subsystem 120 away from the surface for some period of time, and then to return the sensor subsystem 120 to the surface to resume the scan. By maintaining precise position information, such as a scan origin, resuming data collection to extend an existing data map 250 can be achieved in a straightforward manner by suitable techniques known in the art.

In the absence of precise position information, embodiments of the present invention can implement a process similar to the positional drift compensation discussed above. The inspection apparatus 100 may acquire sufficient new data so that a new data map can be aligned relative to the previously populated data map, and the information contained in each data map may be integrated into a single operating data map 250. This permits one additional mode of operation in certain embodiments of the invention, i.e., the integration of multiple separate data maps. By using feature alignment techniques, such as SIFT, data for several regions of a wall may be acquired separately and then stitched using suitable merging and aligning techniques into a larger data map 250 based on overlapping features.

Figure 3:
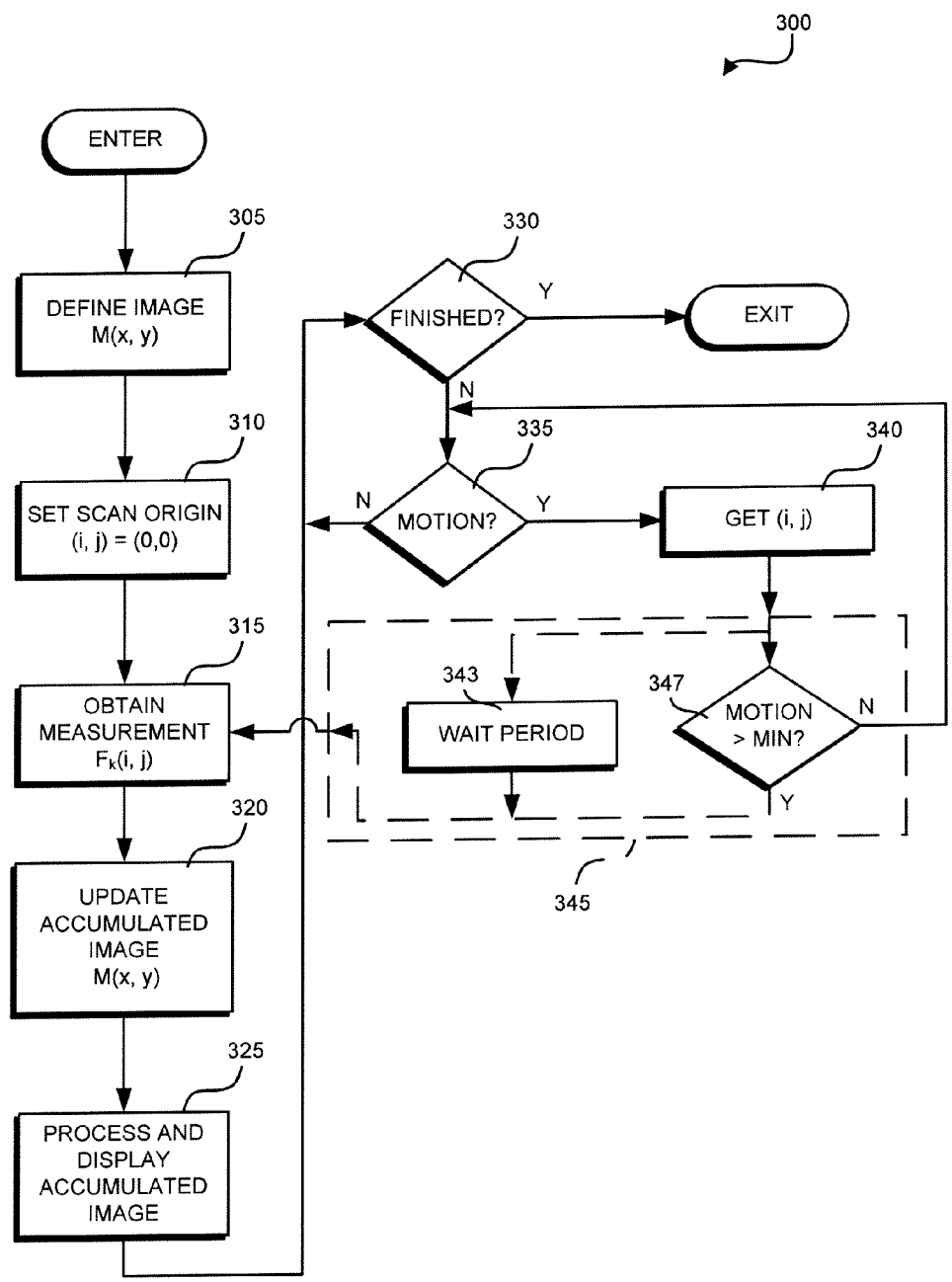
FIG. 3 is a flow diagram of an exemplary data acquisition and display process by which the present general inventive concept may be embodied.

FIG. 3 illustrates an exemplary process 300 by which the present invention may be embodied. Upon entry, exemplary process 300 transitions to operation 305 by which map 250 is established. For example, the spatial arrangement and desired resolution, as well as the mapping function M(x, y) may be defined. Exemplary process 300 transitions to operation 310, whereby a scan origin (i, j)=(0, 0) may be established relative to which the position of sensor subsystem 120 may be tracked. The scan origin (0, 0) may be established, for example, at the position at which initial contact of sensor subsystem 120 with surface 115 is made, by operation of a user control, by a position of a known structural marker, or by means of a known positioning signal, such as is used in GPS, among others.

Exemplary process 300 transitions into a data acquisition loop comprising operations 315-345. In operation 315, a characteristic measurement $F_k(i, j)$ is obtained at the current position of sensor subsystem 120 relative to the scan origin (0, 0). In operation 320, an accumulated image corresponding to map 250 is updated to include data from the latest measurement $F_k(i, j)$. The update operation 320 may include re-computing values at (x, y) that correspond in position to the contact area 255 corresponding to measurement $F_k(i, j)$. In certain embodiments of the present invention, once the accumulated image has been updated, the measurement $F_k(i, j)$ is no longer required and may be discarded. Process 300 may then transition to operation 325, whereby the updated image is processed for presentation and displayed via graphics subsystem 150.

In operation 330, it is determined whether the user has completed the scan, such as, for example, by removing sensing subsystem 120 from surface 115 or by activating a suitable user control. A scan, as used herein, refers to a data acquisition cycle sufficient to cover an inspection region of interest. If the user has completed the scan, exemplary process 300 is terminated. However, if it is determined in operation 330 that the user has yet to complete data acquisition and processing, exemplary process 300 transitions to operation 335, by which it is determined whether sensor subsystem 120 has been moved. Operation 335 may not be explicitly performed, since data sampling can occur even regardless of whether sensing subsystem is moved. If operation 335 evaluates as true, exemplary process 300 transitions to operation 340, whereby an updated position (i, j) of sensor subsystem 120 is obtained. Process 300 may then transition to operation 345, by which conditions are evaluated as to whether measurement operation 315 is to be repeated. As is illustrated in FIG. 3, certain embodiments of the present invention implement a wait period 343, such as through a predetermined processing delay, before another measurement operation 315 is performed. Waiting period 343 need not be explicit; it may be the delay inherent to complete operations 315-345 in each data acquisition and processing cycle. In other embodiments, waiting period 343 may be established to maintain a fixed sample rate. Once the waiting period 343 has lapsed, exemplary process 300 transitions back to operation 315, whereby a new measurement $F_k(i, j)$ is obtained and the data acquisition cycle 315-345 is repeated.

In an alternative embodiment of the present invention, operation 345 is implemented by operation 347, by which a determination is made as to whether motion threshold criteria MIN has been met. For example, if sensor subsystem 120 has not been moved sufficiently far from its previous position, measurement data $F_k(i, j)$ for that position is neither obtained, used to update previously accumulated data, nor displayed. On the other hand, upon sensor subsystem 120 being moved to a position that meets the threshold criteria of operation 347, exemplary process 300 only then transitions to operation 315, whereby a new data acquisition cycle 315-345 begins. Such motion thresholding may provide benefits by, for example, preventing slower processing hardware from becoming overwhelmed with extra spatial samples. In certain embodiments, spatial sampling can be fixed to an approximate grid, such as map 250, via motion thresholding, thereby reducing some of the signal processing overhead associated with non-uniform and irregular samples. When so embodied, threshold MIN sets the resolution Ry, Ry illustrated in FIG. 2B. Moreover, motion thresholding may also be used stabilize the image on the display 152 as the accumulated image displayed thereon is continuously updated, reducing jitter and making it easier for the user to interpret. Such means may also be employed only with respect to the display updates, while still performing updates to the density estimates continuously. In certain embodiments of the invention, smoothing, such as through a time-average, may be employed to filter display changes for easier viewing.

It is to be understood that previously collected and processed measurement data may be displayed without further data collection. In certain embodiments of the present invention, a previously processed data map 250 may be displayed to correspond in position with the location at which the data were originally collected. That is, the data displayed in display 152 may be updated to reflect the hidden structure at the location of sensor subsystem 120, as determined from previous scanning operations.

Figure 5A:
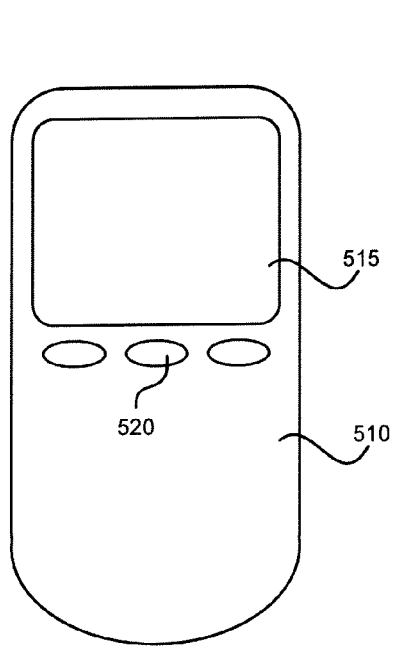
FIGS. 5A-5C are illustrations of a hand-held embodiment of the present general inventive concept.
Figure 5B:
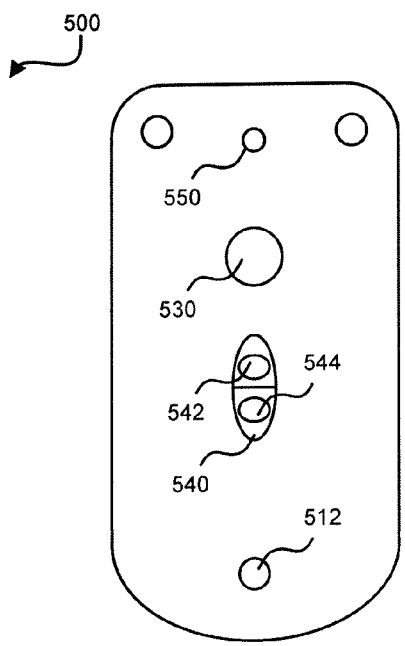
Figure 5C:
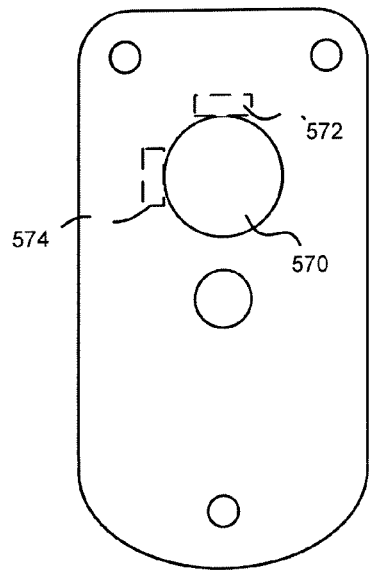

Certain advantages and benefits of the present invention will now be described with reference to a particular application, i.e., determining and displaying structure hidden behind a wall, as is illustrated in FIG. 4. For purposes of description and not limitation, it is to be assumed that all of the subsystems described with reference to FIG. 1, i.e., sensor subsystem 120, processing subsystem 140, graphics subsystem 150 and communications subsystem 130, are contained within a single housing as inspection apparatus 440. An exemplary embodiment of such a system configuration is illustrated in FIGS. 5A-5C as inspection apparatus 500. The inspection apparatus 500 includes a housing 510 to contain the subsystems thereof. The housing 510 has disposed on an upper surface thereof a display 515 and one or more user controls 520. Exemplary user controls 520 provide an interface for the user to control various operations of inspection apparatus 500. On the lower surface of housing 510, there is disposed a position/motion sensor 540, a characteristic measurement sensor 530, and a marking device 550. The exemplary position/motion sensor 540 is a high-sample-rate optical sensor including a light source 542, such as an LED or semiconductor laser, and a receiver 544, such as a photo diode. Alternatively, as is illustrated in FIG. 5C, position/motion sensor may comprise a ball 570 mechanically coupled to orthogonal rotational encoders 572, 574. The underside of housing 510 may further include a plurality of low-friction inserts 512 to facilitate movement of inspection apparatus 500 across the surface.

Returning now to FIG. 4, it is to be assumed that inspection apparatus 440 is configured in a manner similar to inspection apparatus 500 and includes a density sensor as the characteristic measurement sensor, a high-sample-rate optical motion detector as the position/motion sensor and a housing to contain sensor subsystem 120, processing subsystem 140, graphics subsystem 150 and communications subsystem 130. Inspection apparatus 440 may be placed against wall surface 410 to obtain measurements of density at locations in inspection region 400. As is illustrated in FIG. 4, exemplary inspection region 400 includes two wall studs 422, 428, a pipe 426, an electrical box 436, and electrical conduit sections 432, 434, all of which are obscured by wall surface 410. Inspection apparatus 440 may be translated in multiple directions over the wall surface 410, whereby signals indicative of hidden structure in the inspection region 400 are obtained. The density and position signals may be processed by processor subsystem 140, such as by exemplary process 300 described above. As inspection apparatus 440 is moved along a trajectory, which may be in one, two or three dimensions, density readings are taken and used to update the accumulated image map, as described with reference to FIG. 2B and FIG. 3, which may then be displayed on display device 442, as illustrated by two-dimensional image 470. Areas in inspection region 400 not yet sampled may be indicated by a suitable fill pattern on display 442 (not illustrated), whereby the user is informed where data collection has not been performed. Thus, the accumulated image will appear to the user as being filled-in with increasing completeness and detail as inspection apparatus 440 is moved along the scan trajectory in overlapping sensed regions.

In certain embodiments of the present invention, an image may be rendered in memory and such rendered image is referred to herein as memory image 450. Memory image 450 comprises pixel values derived from mapped density measurements that have been made during an inspection scan of inspection region 400. Additionally, memory image 450 may be derived from entries of a similar data structure containing higher order data. For example, memory image 450 may comprise integer values generated from respective floating point values stored elsewhere in memory. When so embodied, memory image 450 is a reduction of the data map 250 to a gridded set of pixel values, e.g., color code values, representative of the accumulated position-indexed values comprising the data map 250. It is to be understood that while memory image 450 is illustrated in FIG. 4 as a complete image of inspection region 400, the actual number of assigned pixel will depend upon the progression of the inspection scan. In FIG. 4, changes in density are illustrated through grid spacing within representations of hidden objects, where finer grid spacing indicates a higher density than coarse grid spacing. It is to be understood that FIG. 4 is schematic and images 450, 470 are depicted using black and white line art for illustration purposes. Certain embodiments of the present invention may employ a meaningful coding scheme, such as through grayscale or coded colors, to indicate detected density ranges, specific material property types, etc.

In memory image 450, wall stud 422 is represented by pixels in the region 452, wall stud 428 is represented by pixels in region 458, pipe 426 is represented by pixels in region 456, junction box 436 is represented by pixels in region 466, conduit 432 is represented by pixels in region 462 and conduit 424 is represented by pixels in region 454. It is to be noted that a change in density may be observed in region 464 that corresponds to a borehole 434 in wall stud 422 to accommodate conduit 432. Moreover, it is to be observed that a higher density region 468 represents a location in inspection region 400 where pipe 426 is closest to the backside of wall 410.

Image 470 displayed on display device 442 may be only a portion of memory image 450. In certain embodiments of the present invention, image 470 in display device 442 acts like a virtual window that is always centered at the location of the inspection apparatus 440. As inspection apparatus is moved from one location to another, as illustrated by the location of inspection apparatus 440', display device 442' and image 470', the depiction of the structure behind wall 410 may appear to scroll, left-right and up-down, with the motion of inspection apparatus 400. This may be achieved in a number of ways, such as by representing the display area as a matrix S of pixel values spaced at fixed intervals, where each pixel value is assigned a value S(m, n), where m and n are the coordinates in the display 442 of the corresponding pixel. The window origin $(0, 0)_w$, which is not to be confused with the spatial origin (0, 0) where the scan originated, may be assigned to the center of the display 442. The current location of inspection apparatus 440 relative to the established spatial origin (0, 0) at any given time may be given by $(i_{now}, j_{now})$, and processing subsystem 140 may update the image 470 in display 442 by retrieving corresponding pixel values from memory image 450:

for each $(x_k, y_k)$ in memory image 450 D;

set $S(x_k - i_{now}, y_k - j_{now}) = D(x_k, y_k)$;

increment k and continue until image 470 is complete.

In certain embodiments of the present invention, the user may dynamically zoom in and out on image 470. This may be accomplished by suitable rescaling techniques whereby the user can visualize the overall hidden structure while zoomed-out and locate details while zoomed-in. Certain embodiments of the present invention may provide a picture-in-picture display, showing the overall structure at zoomed-out scale overlaid with a zoomed-in detail image.

The dynamic range of display 442 may also be scaled, both automatically and by user control. In certain embodiments of the present invention, the dynamic range data in memory from which memory image 450 is constructed, which may be implemented by, for example, floating point values, will be much greater than that of display 442, which may be confined to only integer values. Thus, inspection apparatus 440 may store a broad range of densities, which may scaled for purposes of display. By storing floating point numbers, for example, the display range can be adjusted to suit the range of the data. Other suitable techniques for compressing the dynamic range of data for display may also be used in conjunction with the present invention without deviating from the spirit and intended scope thereof. Storage of measurement data to achieve a broad dynamic range for purposes of display beneficially avoids local self-calibration requirements of the prevailing art, and thus can be used to acquire and monitor data continuously over a large spatial surface without reset.

Display 442 may also be adjusted by the user in brightness, contrast, or in other aspects so that features of interest are clearly visible therein. For example, a user interested in finding wires or deeper tubes or pipes may adjust the contrast in display 442 so that finer detail of such structure is displayed, while gross structure, such as wall studs, is set to a maximum value, or "clipped." In certain embodiments, the user may also select a logarithmic color scale or other ranging techniques to accommodate simultaneous presentation of widely varying structure information.

Figure 6A:
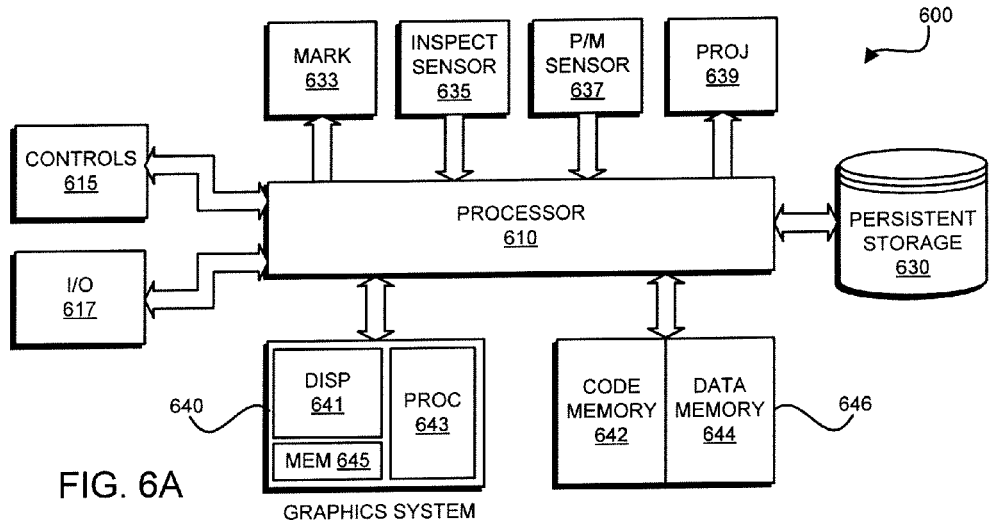
FIGS. 6A-6B are schematic block diagrams of exemplary system configurations by which the present general inventive concept may be embodied.

FIG. 6A illustrates an exemplary system configuration suitable to practice the present invention. Exemplary data processing apparatus 600 of FIG. 6A includes a processor 610 to, among other things, execute processing instructions that implement various functional modules, such as those described below with reference to FIG. 6B. It is to be understood that the present invention is not limited to a particular hardware configuration or instruction set architecture of the processor 610, which may be configured by numerous structures that perform equivalently to those illustrated and described herein. Moreover, it is to be understood that while the processor 610 is illustrated as a single component, certain embodiments of the invention may include distributed processing implementations through multiple processing elements. The present invention is intended to embrace all such alternative implementations, and others that will be apparent to the skilled artisan upon review of this disclosure.

The exemplary data processing apparatus 600 includes an input/output (I/O) system 617, through which the data processing apparatus 600 may communicate with peripheral devices and/or with external network devices (not illustrated), such as to remotely program the data processing apparatus 600, to upload and download preferred setting information, and to download acquired data maps, architectural plan files and the like.

Data processing apparatus 600 may include controls 615 by which data processing apparatus 600 may be operated and controlled. Such controls may include buttons, keyboards, touch screens and/or other devices suitable to provide input to the data processing apparatus 600. A storage unit 646 may be utilized to store data and processing instructions on behalf of the exemplary data processing apparatus 600 and, as such, may include multiple segments, such as a code memory 642 to maintain processor instructions to be executed by the processor 610, and data memory 644 to store data on which processor 610 performs data manipulation operations. Storage unit 646 may include memory that is distributed across components, to include, among others, cache memory and pipeline memory. Data processing apparatus 600 may further include a persistent storage system 630 to store data and processing instructions across processing sessions. The persistent storage system 630 may be implemented in a persistent memory device, such as a hard disk drive or flash memory.

Exemplary data processing apparatus 600 includes an inspection sensor system 635 comprising one or more characteristic measurement sensors and a position/motion sensor system 637 comprising one or more motion detecting and/or position detecting sensors. Inspection sensor system 635 and position/motion sensor system 637 may include suitable circuitry to condition analog signals and convert the analog signals to numerical values that can be machine-processed, such as by processor 610.

Figure 8:
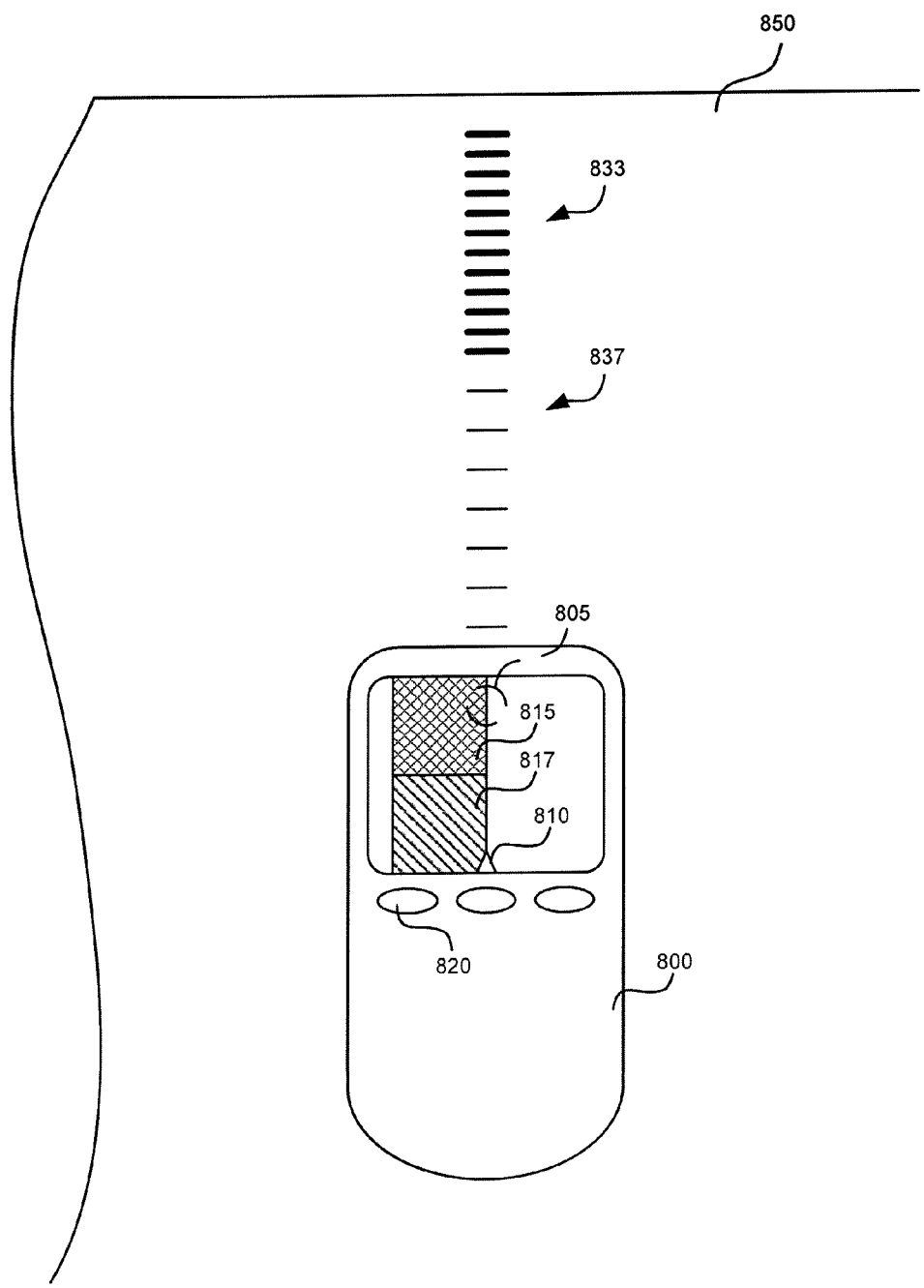
FIG. 8 is an illustration of an inspection apparatus embodying the present general inventive concept implementing an optional marking feature.

Data processing apparatus 600 may include a marking device 633, which implements processor-controlled marking of the surface of the inspection region, as is described more fully with reference to FIG. 8. Marking device 633 may be implemented in suitable hardware, such as inkjet, film transfer, thermal marking, stylus marking, etc., by which a surface can be marked as the inspection apparatus is moved thereon. It is to be understood that such marking device 633 is optional and that a marking device that is not under processor control may also be utilized with the present invention without deviating from the spirit and intended scope thereof.

Exemplary data processing apparatus 600 includes a graphics subsystem 640 to render and display images of hidden structure in accordance with the present invention. Graphics subsystem 640 may include a dedicated processor 643, and dedicated memory 645 in which memory images may be rendered. Exemplary graphics subsystem 640 includes a display device 641 to display images and other data to the user. Additionally, data processing apparatus 600 may include a projecting device, such as a modulated laser, a liquid crystal display (LCD) projector, etc., by which an image of the hidden structure may be projected onto a surface of the corresponding inspection region. Projector implementations of the present invention are described with reference to FIGS. 10-11.

Figure 6B:
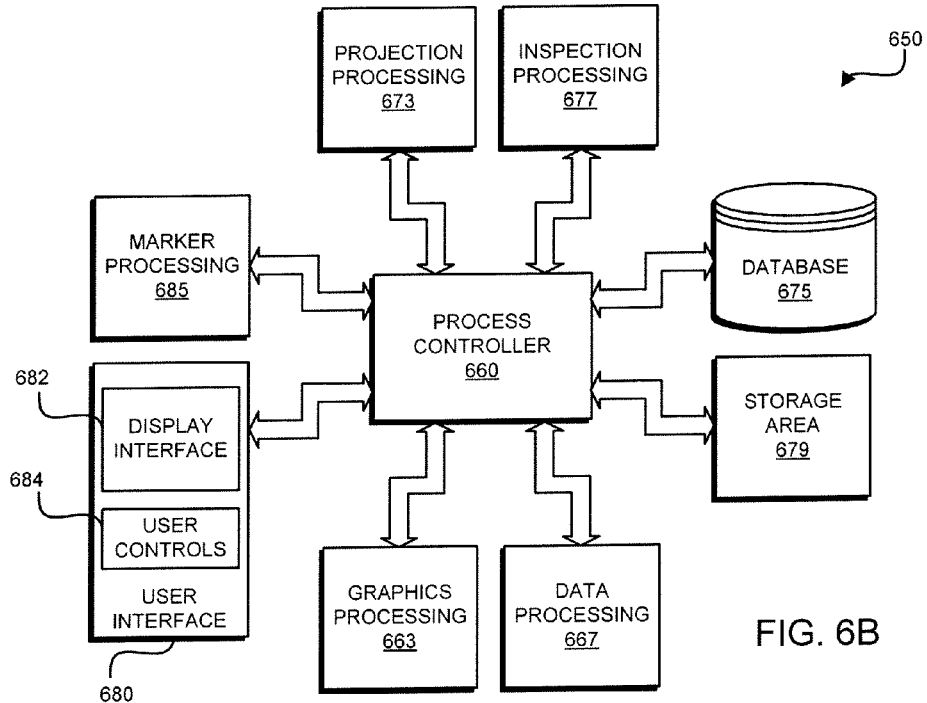

FIG. 6B illustrates an exemplary configuration of functional components suitable to practice certain embodiments of the present invention. The exemplary system illustrated in FIG. 6B may be implemented through processing instructions executed on the processor 620, and in cooperation with other components as illustrated in FIG. 6A, form an exemplary inspection system 650 on the exemplary data processing apparatus 600. Alternatively, inspection system 650 may be implemented entirely in suitable hardware, such as through programmable logic, Application Specific Integrated Circuits (ASIC), and the like.

Inspection system 650 may include a process controller 660 to coordinate and control the interoperations of the functional components thereof per the requirements of the implementation of the inspection system 650. Upon review of this disclosure, the ordinarily skilled artisan will recognize a wide range of well-known process control methods and apparatuses by which a process controller 660 suitable for use with the present invention may be implemented. The present invention is intended to encompass all such alternatives of the process controller 660, including multi-threaded and distributed process control methodologies.

Inspection system 650 may include a user interface 680 through which the inspection system 650 interacts with a user. The user interface 680 may be implemented by a combination of hardware devices and suitably programmed processing instructions executed by the processor 610 and/or by a dedicated processor 643 of graphics system 640. The user interface 680 may be used to present hidden structure data to the user in a meaningful form on a display interface 682, such as described above, as well as suitable data management interfaces, such as for hierarchical file storage, control functions, and other information recognized by the user. The user interface 680 may interpret user manipulations of user controls 684, which may be implemented in a combination of hardware and software, into messages and instructions that can be recognized by the process controller 660 to afford the user interactivity with and control over the inspection system 650. The user controls 684 may include controls 615 described above, and may also include software implemented controls on the display interface 682, such as toolbars and/or buttons, menus of commands, text command entry blocks, and other suitable software controls. The foregoing description of the user interface 680 may be met by a suitably configured graphical user interface (GUI), the implementation details of such will be omitted in the interest of conciseness.

Inspection system 650 may include a storage area 679 in which data can be temporarily stored and retrieved as required during various data processing operations. Such storage area may be implemented in the data memory segment 644 of storage unit 646. Additionally, inspection apparatus 650 may include a database 675 to store, among other things, libraries and templates of auxiliary data to assist the user in determining the nature of the hidden structure. For example, survey or blueprint plan information may be stored in database 675 by which a user may compare actual structure, as obtained by the inspection system 650, to expected structure contained in an engineering plan file. Data contained in an engineering plan file may be overlaid onto accumulated image data to assist in the comparison. Accordingly, database 675 may be coupled to a larger database through a communication network and pertinent engineering files may be downloaded from an external database into database 675 as needed.

Inspection system 650 may include an inspection processing unit 677 to process sensor data from inspection sensor system 635 and position/motion system 637. For example, inspection processing unit 677 may associate position data from position/motion sensor 637 to characteristic measurement data from inspection sensor 635. Additionally, inspection processing unit 677 may establish a scanning origin, compute position data relative to the scanning origin and may compensate position data for any sensor offset between a position sensor of position/motion sensor system 637 and one or more corresponding inspection sensors in inspection sensor system 635. Inspection processing unit 677 may store the associated characteristic measurement data and position data in storage area 679 for use by other functional units. Inspection processing unit 677 may also revise position data to compensate for drift in the position of inspection system 650. For example, the accumulated image may be shifted, stretched, rotated, etc., to maintain the position of the image in the display when substantially equivalent, but slightly different measurement locations (i, j) are visited more than once in a scan.

Data processing unit 667 may retrieve measurement data from storage area 679 and map such measurement data into a data structure, such as the rectangular memory grid described with reference to FIG. 2B. Additionally, as new measurement data are obtained during scanning operations, data processing unit 667 may update the mapped data structure by adding new data points where initial measurement data are obtained and by re-computing values for data points for which measurement data has been previously obtained. Upon completing the data mapping and other data processing operations that are based on characteristic measurements, data processing unit 667 may evaluate whether measurement data are to be discarded, thereby releasing resources for newly obtained data.

Exemplary inspection system 650 includes a graphics processing unit 663 to prepare the data in the previously-described mapped data structure for display. For example, graphics processing unit 663 may convert floating point numbers in the mapped data structure to integer values corresponding to colors, shading, fill patterns, etc., and to render a memory image using the integer values. Graphics processing system 663 may further relatively scale the mapped data to highlight certain structural features, may implement contrast and brightness processing, zooming, window scrolling, data centering, graphical overlay and other such graphical operations per the application requirements of the present invention. The present invention is not limited to any particular set of graphical operations and the ordinarily skilled artisan will recognize numerous image processing and display techniques that can be used in conjunction with the present invention without departing from the spirit and overall scope thereof. Additionally, graphics processing unit 663 may generate image data to be presented in a virtual window, such as described above.

Exemplary projection processing unit 673 provides additional graphical support for projecting an image of hidden structure onto a surface. In certain embodiments of the present invention, projection processing unit 673 may provide alignment and registration processing, by which an image of structure in a large inspection region may be projected onto the obscuring surface in proper alignment. For example, a mark may be applied to the surface at the scan origin, such as by a marking device described below, and projection processing unit 673 may insert or overlay a corresponding mark in the image to be displayed. Accordingly, a user may align the mark on the surface and the corresponding mark in the projected image, thus displaying the structure represented in the image on the surface in the inspection region at the at the actual physical location of such structure. Additionally, projection processing unit 673 may format a data stream corresponding to a graphical depiction of the structure so that a suitable light modulator, e.g., a laser modulator, an LCD projector modulator, etc., can project such graphical depiction of the structure on a surface.

Marker processing unit 685 formats marking data, which are transferred to a surface being scanned through marking device 633. Marker processing unit 685 may generate marking patterns representative of hidden structure and provide such patterns to marking device 633. Accelerometers and/or other devices may be used to track scanning speed and, in conjunction with the position data produced by inspection processing unit 677, the mark application timing of marking device 633 can be controlled to overlay the markings on the target structure.

Certain embodiments of the present invention may include multiple inspection sensors to ascertain characteristics associated with hidden structure. Sensing modalities can be selected with deeper or with adjustable penetration depths so as to inspect deeper structure or to sense objects or occupants on the other side of an obstructing barrier. When multiple characteristic measurement sensor types are employed in a single inspection apparatus, each sensor may be read while the inspection apparatus is positioned at a location (i, j), and the characteristic measurement values from each sensor may be associated with position data that has been compensated for spacing between sensors. In certain embodiments of the present invention, information from multiple diverse sensors may be combined to present additional, useful information to a user. For example, a metal detecting sensor in proximity to, say, a material density sensor can be used to simultaneously accumulate both density and material information. Thus, processor subsystem 140 may produce an image in which metal objects in one color coding scheme may be overlaid in a similar or distinct coding with density data. Other embodiments of the present invention may incorporate both absolute density and edge detection sensors to display general density patterns with overlaid crisp edge indications of, say, studs and other sharply delineated objects. Certain embodiments of the present invention may incorporate electrical activity sensors to provide indications of A/C or D/C currents behind an obscuring barrier to distinguish, for example, house wiring from, say, flexible tubing carrying water.

Figure 7A:
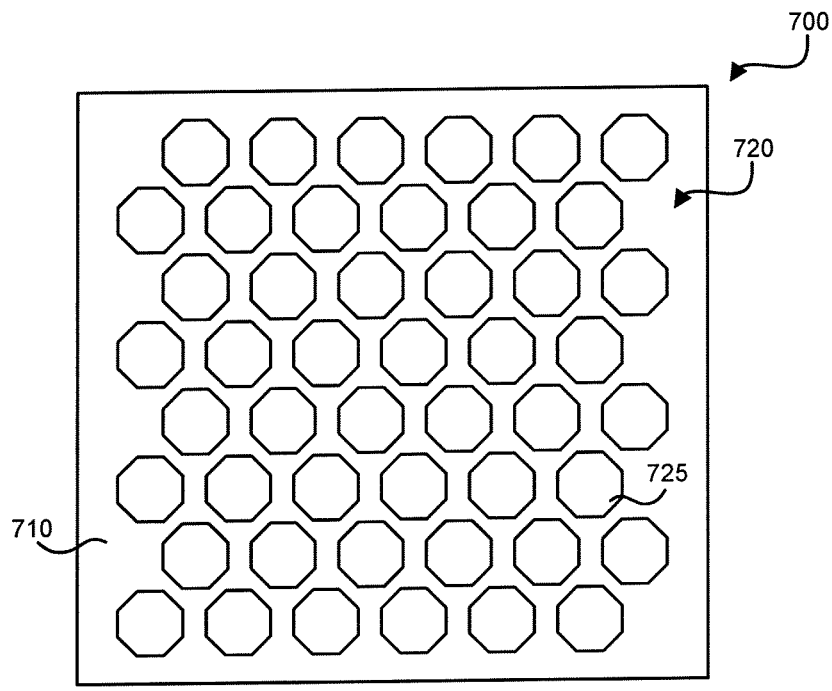
FIGS. 7A-7B are illustrations of exemplary characteristics sensor arrangements usable in certain embodiments of the present general inventive concept.
Figure 7B:
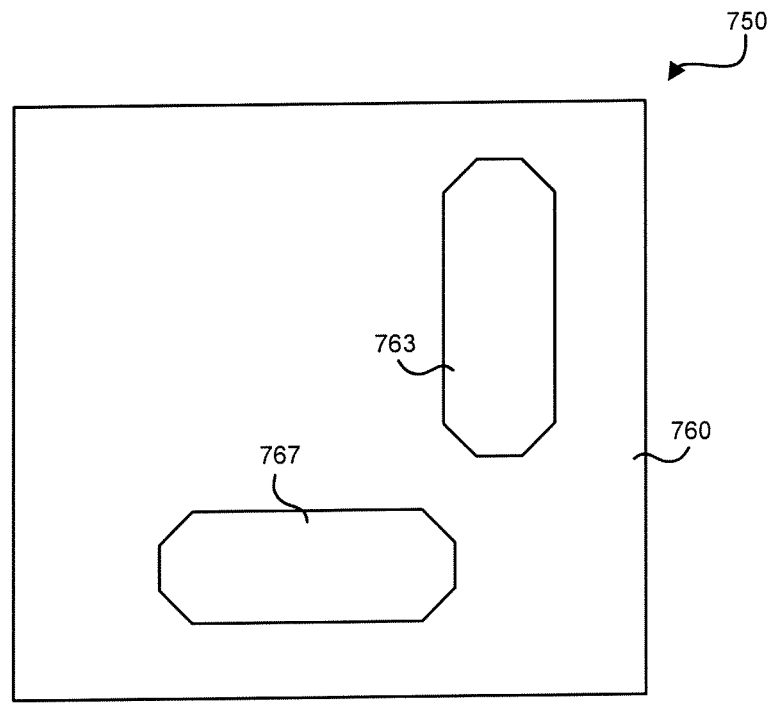

In FIG. 7A, there is illustrated an exemplary sensing system 700 comprising an array 720 of sensors 725 by which data acquisition may be achieved. The array 720 may be disposed on a suitable substrate 710, and each individual sensing element 725 generates a signal indicative of a characteristic measurement that is mapped or otherwise factored into an informational image. Such arrays may afford data acquisition over a broader surface area in an inspection region with each pass of the inspection apparatus. The individual sensor elements 725 may produce the same or different information about the target structure without departing from the spirit and intended scope of the present invention. When different characteristic information is available, such may be combined to indicate a single structural aspect, such as object class (metal pipe vs. plastic pipe, for example), or may be overlaid one on another to indicate separate structural aspects.

FIG. 7B illustrates an alternative sensing system 750 in which two sensing elements 763, 767 are disposed on a substrate 760. When so embodied, sensor 763 may operate preferentially in the left-right edge orientation due to its greater contact area in that direction, while sensor 767 may operate preferentially in the up-down edge orientation. Because the sensing occurs in separate physical locations, measurement interference between sensor data may be minimized. However, because the spatial sensing is achieved by moving the inspection apparatus over a wall or other target surface in multiple directions, both sensing elements 763, 767 may be used to sample substantially the same spatial points in an inspection region and the acquired information may be utilized in an accumulated image update, such as that described with reference to FIG. 2B.

Any number of additional sensors may be included in an arrangement like that illustrated in FIG. 7B, including arrangements of different sensor types. For example, certain embodiments of the present invention may incorporate two orthogonally-oriented edge sensors and a third metal detector element, all of which would sense locally and substantially independently of their neighbors, while the combined information is recorded and spatially integrated by processing subsystem 140.

Referring now to FIG. 8, there is illustrated an inspection apparatus 800 similar to that of FIG. 5. As described with reference to FIG. 5, inspection apparatus 800 includes a marking device 805 disposed on the underside of the housing to mark surface 850 with, for example, ink patterns 833, 837 indicative of the location of hidden items of interest. Marking device 805 may be disposed on inspection apparatus 800 to mark a region identified by indicator 810 in display 840, such that the indicated region, such as the edge of object 815, 817 is marked as the user moves inspection apparatus 800. Additionally, the marking patterns applied by marking device 805 may indicate density or other properties by altering the nature of the applied markings. For example, marking pattern 833, corresponding to displayed region 815, may indicate a denser object or region, whereas marking pattern 837, corresponding to displayed region 817, may indicate a relatively less dense object or region. It is to be understood that while marking device 805 is illustrated in axial alignment with the inspection apparatus 800, marking device 805 may be located elsewhere without departing from the spirit and intended scope of the present invention.

Marking device 805 may be activated manually or automatically. For example, in one embodiment of the present invention, marking device 805 applies ink only when the user enables a marking mode, such as by a user control 820. Alternatively, marker device 805 may be a simple mechanical device, such as a pen or scribe pushed into place by the user to record places of interest on the wall.

Figure 9A:
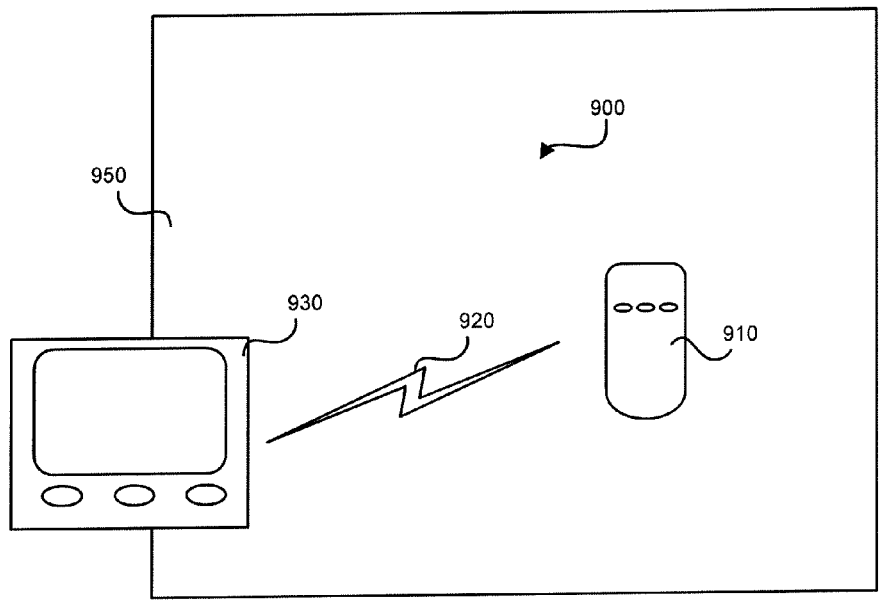
FIGS. 9A-9C are illustrations of embodiments of the present general inventive concept utilizing separable system components.

In certain embodiments of the present invention, such as is illustrated in FIG. 9A, inspection apparatus 900 is divided into a sensing head 910, which is moved over a surface 950, and a processing and display unit 930. The sensing head 910 may be communicatively coupled to processing and display unit 930 by a suitable communications link 920, which may be a wireless link, such as a WiFi or Bluetooth link, or a wired link, such as a Universal Serial Bus (USB) connection. When so embodied, a larger display may be incorporated into the inspection apparatus 900, which may be held separately or placed on a stand at a fixed location. In certain embodiments of the present invention, processing and display unit 930 is implemented on general purpose computing machinery, such as, for example, on a laptop, tablet, netbook, or palm-top computer, executing processing software to receive signals from the sensing head 910 over communication link 920 and to accumulate and display acquired information.

Figures 9B, 9C:
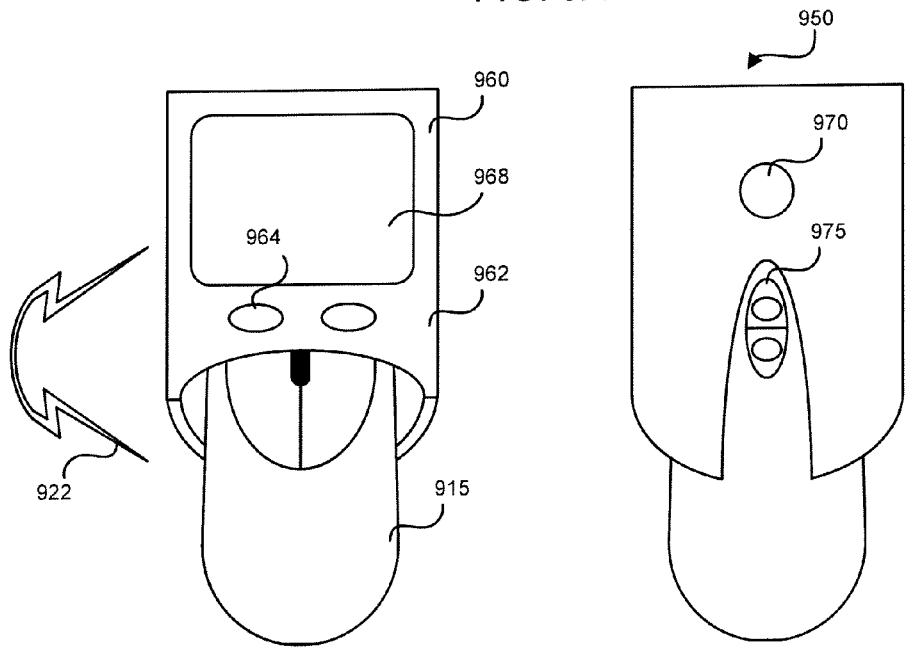

Due to the flexibility in distributing functionality across separable units, the present invention may be embodied in a variety of unique system configurations. For example, the exemplary inspection apparatus 950 illustrated in FIGS. 9B-9C utilizes a standard computer mouse 915 communicatively coupled to processing and display unit 960 through a communication link 922. The processing and display unit 960 includes a display 968 disposed on the separable housing 962, user controls 964 and one or more characteristic measurement sensors 970. The inspection apparatus 950 may utilize the position/motion sensor 975 on mouse 915 to determine location and such location is communicated in a standard way to processing and display unit 960. For example, a mouse 915 may implement a wireless transmitter (not illustrated) to communicate position information to a remote device, typically a computer, over a wireless communication link 922. Processing and display unit 960 may include a wireless receiver (not illustrated) to intercept the location signal from mouse 915 and may utilize position data therein in a manner similar to that already described above.

Figure 10:
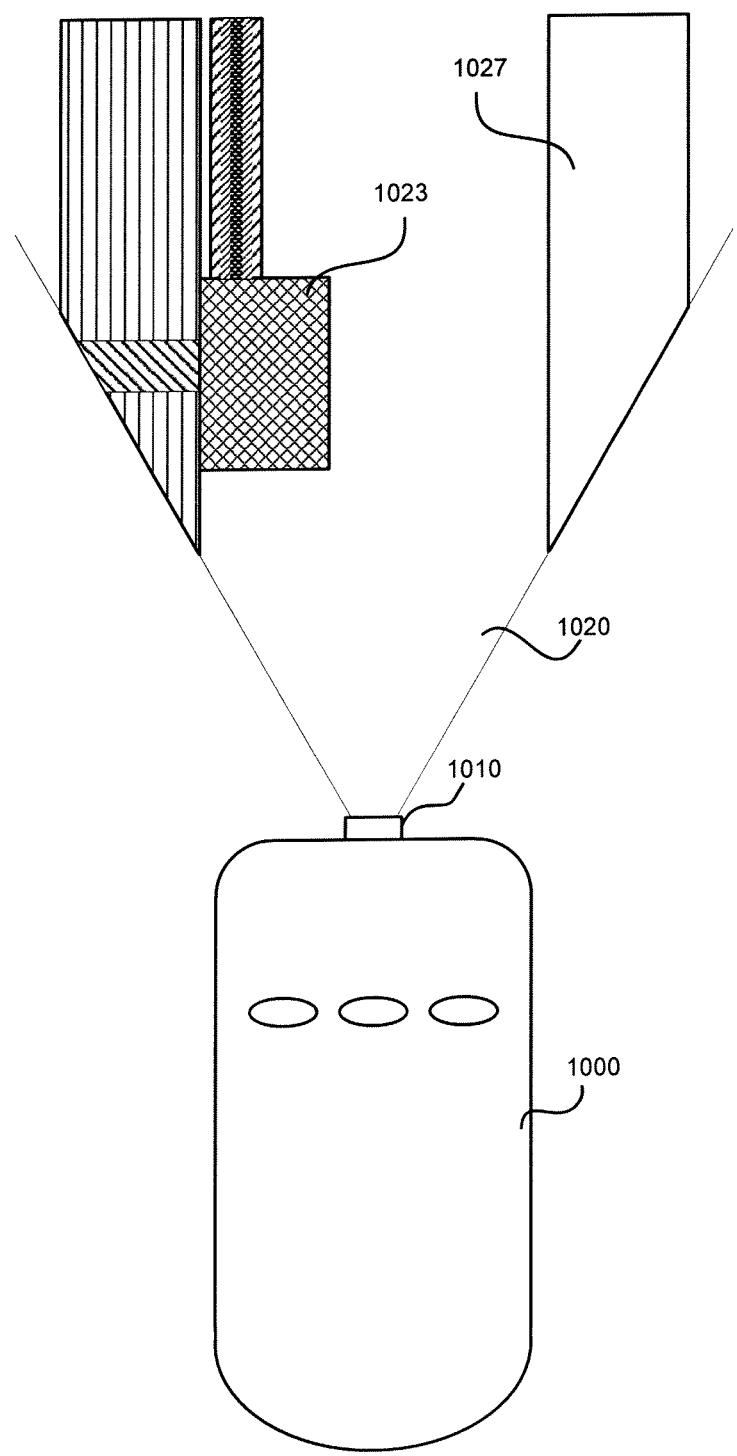
FIG. 10 is an illustration of an inspection apparatus embodying the present general inventive concept implementing an image projecting device.

In certain embodiments of the present invention, as is illustrated in FIG. 10, a handheld inspection apparatus 1000 includes an optical projection device 1010, such as a diode laser (not illustrated), which projects a spatially modulated beam onto the inspected surface to generate an image 1020 of the hidden structure directly on the target surface. In certain embodiments of the present invention, image 1020 includes detailed information, such as density illustrated in projected region 1023. In other embodiments, projected image 1020 includes simple information, such as edges illustrated in region 1027. The projected image 1020 may be generated to reflect the hidden structure at the position of the inspection apparatus 1000 and such image may be updated in a manner similar to that described above with reference to FIG. 2B as the position of inspection apparatus 1000 changes. Thus, image 1020 may be generated to appear as though fixed in space on the inspected surface with each component of the hidden structure projected in proper position and scale.

Figure 11:
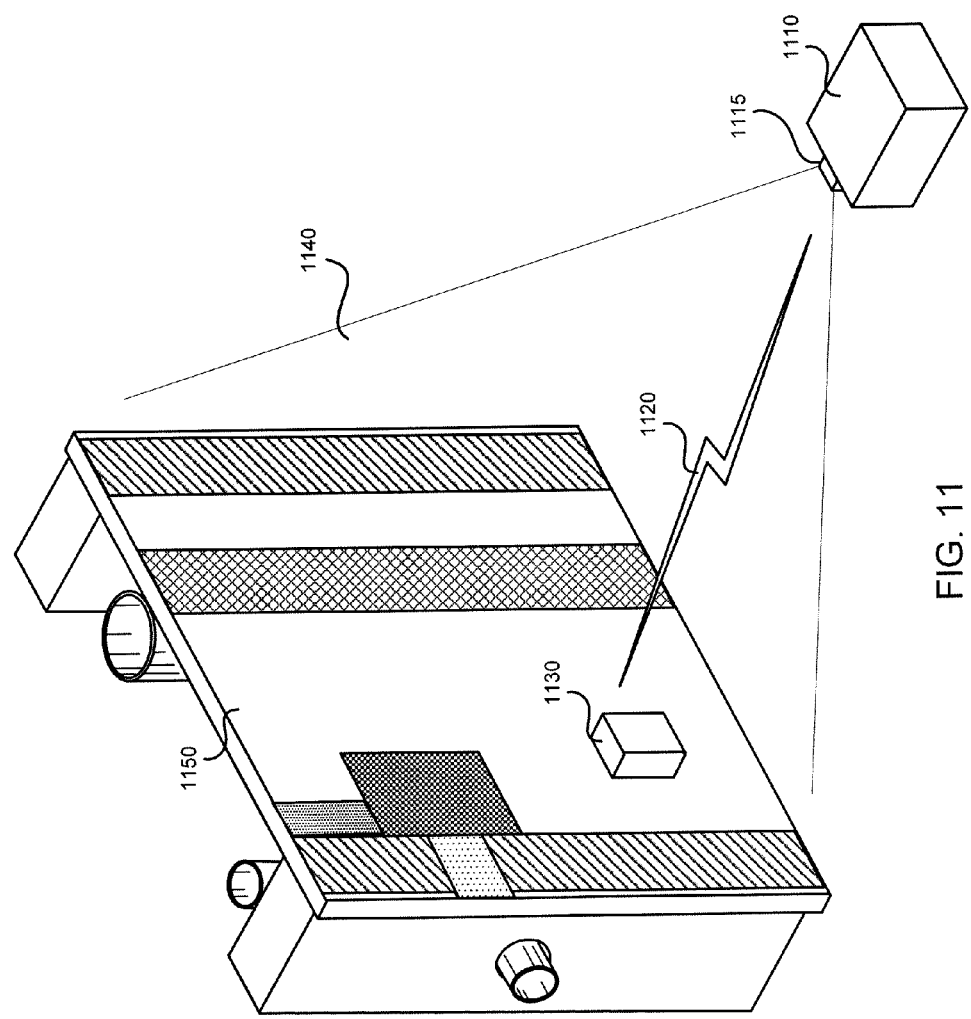
FIG. 11 is an illustration of an inspection apparatus embodying the present general inventive concept implementing an alternative image projecting device.

The means for projection of the image may, in other embodiments, be physically separated from the sensing device, such as is illustrated in FIG. 11. A processing and display unit 1110 may receive information from a sensing head 1130 over a communication link 1120 and may include a projector 1115 to project structural information directly on the surface of the wall 1150 in accurate locations and scale to reflect the hidden structure. In certain embodiments of the present invention, projector 1115 projects not only location data, but characterization data as well. For example, projector 1115 may be an LCD or microelectromechanical system (MEMS) minor projector. By projecting position-accurate hidden structure information over a broad area, multiple users can avail themselves of information for inspection, marking, or other purposes.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An apparatus to inspect a region of interest for physical structure through a surface therein, the apparatus comprising:
   at least one sensor configured to generate a characteristic signal as the sensor is moved across the surface in the region of interest, the sensor defining a contact area on the surface over which at least one physical characteristic at each measurement location on the surface to which the sensor is moved is characterized by an attribute of the characteristic signal;
   a memory comprising storage locations logically-arranged in accordance with a coordinate system to represent map locations of a data map;
   a processor configured to:
      determine the map locations representing the contact area in the coordinate system of the data map for each measurement location;
      estimate values of a structural characteristic of the physical structure from the quantified attribute of the characteristic signal for the map locations representing the contact area at the measurement location at which the characteristic signal was generated; and
      store the computed values at the respective map locations of the data map; and
   a display to generate a two-dimensional visual image from the data map.

2. A method of characterizing physical structure through a surface in a region of interest, the method comprising:
   establishing a data map in a memory having map locations logically arranged in accordance with a predetermined coordinate system;
   generating a characteristic signal by at least one sensor as the sensor is moved over the surface, the characteristic signal having an attribute quantifying a physical characteristic over a contact area defined by the sensor on the surface at each measurement location at which the sensor is moved;

determining, by a processor, the map locations representing the contact area in the coordinate system of the data map for each measurement location;

estimating, by the processor, values of a structural characteristic of the physical structure from the quantified attribute of the characteristic signal for the map locations representing the contact area in the data map for the measurement location at which the characteristic signal was generated;

storing the estimated values of the structural characteristic at the respective map locations of the data map; and displaying, on a display, a two-dimensional image of pixels arranged per the predetermined coordinate system and assigned pixel values corresponding to the estimated structural characteristic values in the data map.

3. The method of claim 2, wherein estimating the values of the structural characteristic comprises:

computing, by the processor, the values of the structural characteristic for each of the map locations in accordance with a sampling function defined over the contact area; and updating, by the processor with the computed values of the structural characteristic, the estimated values of the structural characteristic stored at memory locations corresponding to the contact area at other measurement locations at which the sensor was previously moved.

4. The method of claim 3, wherein computing the values of the structural characteristic comprises:

weighting, by the processor in accordance with the sampling function, the attribute of the characteristic signal generated at the measurement location across the memory locations representing the contact area in the data map.

5. The method of claim 4, wherein updating the estimated values comprises:

convolving, by the processor, the weighted characteristic signal in the memory locations representing the contact area with the estimated values of the structural characteristic stored at the memory locations corresponding to the contact area at the other measurement locations.

6. The method of claim 2, wherein the estimated structural characteristic is density.

7. The method of claim 2, further comprising:
generating a positioning signal by the at least one sensor; and
determining, by the processor, the measurement location relative to the other measurement locations from the positioning signal.

8. The method of claim 2, further comprising:
moving the at least one sensor, the memory and the display on a free-form trajectory in a common housing held in one hand of a user.

9. The apparatus of claim 1, wherein the processor is further configured to:
compute the values of the structural characteristic for each of the map locations in accordance with a sampling function defined over the contact area; and
update, with the computed values of the structural characteristic, the estimated values of the structural characteristic stored at the memory locations corresponding to the contact area at other measurement locations at which the sensor was previously moved.

10. The apparatus of claim 9, wherein the processor is further configured to:
weight, in accordance with the sampling function, the attribute of the characteristic signal generated at the measurement location across the memory locations representing the contact area in the data map.

11. The apparatus of claim 10, wherein the processor is further configured to:
convolve the weighted characteristic signal in the memory locations representing the contact area with the estimated values of the structural characteristic stored at the memory locations corresponding to the contact area at the other measurement locations.

12. The apparatus of claim 1, wherein the at least one sensor comprises:
an inspection sensor configured to generate the characteristic signal; and
a positioning sensor configured to generate a positioning signal by which the measurement location is determined relative to other measurement locations as the positioning sensor is moved across the surface.

13. The apparatus of claim 12, wherein the positioning sensor is includes encoders that generate the positioning signal as relative displacement in a Cartesian coordinate system.

14. The apparatus of claim 1, wherein further comprising:
a housing in which the inspection sensor, the positioning sensor, the processor and the display are commonly housed.

15. An apparatus to inspect a region of interest for physical structure through a surface therein, the apparatus comprising:
a position sensor configured to generate a positioning signal by which a measurement location is determined relative to other measurement locations in a predetermined coordinate system;
an inspection sensor configured to generate a characteristic signal at each measurement location on the surface to which the sensor is moved, the characteristic signal quantifying a physical characteristic of the physical structure by an attribute thereof;
a memory comprising storage locations logically-arranged in accordance with the coordinate system to represent map locations of a data map;
a processor configured to store values of a structural characteristic of the physical structure estimated from the quantified attribute of the characteristic signal for the map locations representing the measurement location determined from the positioning signal.

16. The apparatus of claim 15, further comprising a display configured to generate a two-dimensional visual image from the data map.

17. The apparatus of claim 15, wherein the inspection sensor defines a contact area on the surface at the measurement location over which the physical characteristic is quantified by the attribute of characteristic signal.

18. The apparatus of claim 17, wherein the processor is further configured to:
determine the map locations representing the contact area in the coordinate system for each measurement location;
compute the values of the structural characteristic for each of the map locations in accordance with a sampling function defined over the contact area; and
update, with the computed values of the structural characteristic, the estimated values of the structural characteristic stored at the memory locations corresponding to the contact area at other measurement locations at which the inspection sensor was previously moved.

19. The apparatus of claim 18, wherein the processor is further configured to:

weight, in accordance with the sampling function, the attribute of the characteristic signal generated at the measurement location across the memory locations representing the contact area in the data map.

20. The apparatus of claim 19, wherein the processor is further configured to:
convolve the weighted characteristic signal in the memory locations representing the contact area with the estimated values of the structural characteristic stored at the memory locations corresponding to the contact area at the other measurement locations.

21. The apparatus of claim 15, further comprising:
a housing in which the inspection sensor, the positioning sensor and the processor are commonly housed.

22. The apparatus of claim 15, wherein the housing is movable across the surface in one hand of a user.

* * * * *

UNITED STATES PATENT AND TRADEMARK OFFICE
CERTIFICATE OF CORRECTION

PATENT NO. : 9,329,305 B2
APPLICATION NO. : 14/245027
DATED : May 3, 2016
INVENTOR(S) : Jeffrey M. Sieracki Page 1 of 1

It is certified that error appears in the above-identified patent and that said Letters Patent is hereby corrected as shown below:

In the specification,

Column 20, line 16, change "minor" to --mirror--

Signed and Sealed this
Ninth Day of August, 2016

Michelle K. Lee
*Director of the United States Patent and Trademark Office*